United States Patent
Bell et al.

(10) Patent No.: US 9,065,834 B2
(45) Date of Patent: *Jun. 23, 2015

(54) SYSTEM AND METHOD FOR PERFORMING SIGNALING ON BEHALF OF A STATELESS CLIENT

(75) Inventors: Robert T. Bell, Bountiful, UT (US); Paul S. Hahn, Plano, TX (US); Michael H. McClung, Middleburg, VA (US); Richard B. Platt, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 12/762,677

(22) Filed: Apr. 19, 2010

(65) Prior Publication Data

US 2010/0205280 A1 Aug. 12, 2010

Related U.S. Application Data

(63) Continuation of application No. 09/032,083, filed on Feb. 27, 1998, now Pat. No. 7,701,924.

(51) Int. Cl.
*H04L 12/66* (2006.01)
*H04L 12/28* (2006.01)
*H04J 3/16* (2006.01)
*H04L 29/06* (2006.01)

(52) U.S. Cl.
CPC .......... *H04L 65/104* (2013.01); *H04L 65/1053* (2013.01); *H04L 65/1069* (2013.01); *H04L 65/1059* (2013.01); *H04L 65/103* (2013.01)

(58) Field of Classification Search
CPC . H04L 65/103; H04L 65/104; H04L 65/1053; H04L 65/1069

USPC .................................. 370/351–356, 400–402
See application file for complete search history.

(56) References Cited

U.S. PATENT DOCUMENTS

| | | | | |
|---|---|---|---|---|
| 5,604,737 | A | * | 2/1997 | Iwami et al. ................... 370/352 |
| 5,724,355 | A | | 3/1998 | Bruno et al. .................... 370/401 |
| 5,726,984 | A | | 3/1998 | Kubler et al. .................. 370/349 |
| 5,732,078 | A | | 3/1998 | Arango .......................... 370/355 |
| 5,742,596 | A | * | 4/1998 | Baratz et al. ................... 370/356 |
| 5,862,134 | A | | 1/1999 | Deng ............................. 370/352 |
| 5,892,764 | A | * | 4/1999 | Riemann et al. ............... 370/401 |
| 5,946,386 | A | | 8/1999 | Rogers et al. ............. 379/265.09 |
| 6,185,288 | B1 | | 2/2001 | Wong ............................. 370/352 |
| 6,198,738 | B1 | * | 3/2001 | Chang et al. ................... 370/352 |
| 6,201,804 | B1 | | 3/2001 | Kikinis .......................... 370/352 |
| 6,208,639 | B1 | | 3/2001 | Murai ............................ 370/401 |
| 6,233,234 | B1 | * | 5/2001 | Curry et al. .................... 370/356 |
| 6,385,193 | B1 | | 5/2002 | Civaniar et al. ............... 370/352 |
| 6,683,870 | B1 | * | 1/2004 | Archer .......................... 370/356 |
| 6,711,166 | B1 | * | 3/2004 | Amir et al. ................. 370/395.1 |
| 6,728,236 | B2 | * | 4/2004 | Potter et al. .................... 370/352 |
| 7,701,924 | B1 | * | 4/2010 | Bell et al. ...................... 370/352 |

* cited by examiner

*Primary Examiner* — Steven H Nguyen
(74) *Attorney, Agent, or Firm* — Baker Botts L.L.P.

(57) ABSTRACT

A system for, and method for, performing state-based signaling on behalf of a stateless client. In one embodiment, the system includes a controller, couplable to a state-based terminal, that translates at least one stateless signaling message received from the stateless client to at least one state-based signaling message for presentation to the state-based terminal thereby facilitating a media stream communications session between the stateless client and the state-based terminal over an Internet Protocol (IP)-based network.

17 Claims, 4 Drawing Sheets

__US 9,065,834 B2__

SYSTEM AND METHOD FOR PERFORMING SIGNALING ON BEHALF OF A STATELESS CLIENT

CROSS-REFERENCE TO RELATED APPLICATION

This application is a continuation of U.S. application Ser. No. 09/032,083 filed Feb. 27, 1998 and entitled "System and Method for Performing Signaling on Behalf of a Stateless Client."

TECHNICAL FIELD OF THE INVENTION

The present invention is directed, in general, to communication systems and, more specifically, to a system and method for performing signaling on behalf of a stateless client and a communications network employing the same.

BACKGROUND OF THE INVENTION

Under the definitions of the International Telecommunications Union-Telecommunications Sector (ITU-T) Recommendation H.323 and related documents, it is assumed that the compliant communications endpoints contain all of the intelligence necessary to perform the protocols and procedures specified within these documents. Due to the complexity of these specifications, a significant computational power requirement is placed upon these endpoints. These current standards-based, protocol and procedure signaling methods may be described as complex. The protocols are state driven with both a large set of states and a large set of state transitions. Additionally, the protocols generally include a large set of messages and a large set of message elements.

If the endpoint is a computer-based workstation, processing the state-based protocols may be satisfied with relative ease. If the endpoints are not computer-based workstations, however, processing the state-based protocols typically dictates the inclusion of a relatively high-powered and expensive computer processor in combination with a dedicated device, known as a low-capability client. Typically, the low-capability client uses stateless messaging which is generally less complex having both limited messages and limited message elements. The actual functionality of the low-capability client does not otherwise require processor-based intelligence to perform its principle tasks or functions. Employing intelligence such as a processor with the low-capability client increases both the cost and design complexity as well as the requirements to meet other constraints on the system such as radiated emissions or temperature environments.

As the ITU-T Recommendation H.323 and related recommendations evolve, a higher and higher burden will be placed upon the low-capability clients such that they may remain interoperable with other computer-based workstations. Current methods for telephony signaling over Internet Protocol (IP) networks using ITU-T Recommendation H.323 protocols are typically rich in depth and scope of features. Rapid evolvement of the industry is driving a constant modification of current methods as well as the development of new methods.

As a consequence, the fundamental issues associated with deploying telephony over IP networks include difficulty in adapting to and supporting new and changing signaling methods at client devices, particularly as the number of clients increases. Additionally, added complexity along with the associated escalating cost of supporting the various signaling methods at a telephony client device further raises the costs, even though cost is expected to remain low.

An additional deficiency in the low-capability clients is the provision of services, such as call forwarding or voice messaging, for devices that are not on-line. Currently, the end station must supply all of the required features. If the end station is not functional at the time these features are requested, either through alternate usage or because it is powered down, then these vital communications features are not provided.

A proxy device may be defined as one that acts for or in the interest of an end station or remote terminal device. Proxy devices for data communications equipment exist today. For example, a File Transfer Protocol (FTP) proxy device, resident at the firewall boundary between an enterprise intranet and an external internet, allows an internet-based user with an FTP client to conduct an FTP session with an intranet-based server through the FTP proxy device. In the case of data communications protocols, the FTP proxy does not extend services to the intranet client. It merely forwards a request for action to the intranet client. The intranet server must have an FTP server application present and active in order to communicate with the calling internet client. Thus, the FTP proxy in this example does not fully act on behalf of the called internet client.

Generally, in the case of audio or audio-video client terminals rather than data terminals, there is currently no system which defines the behavior of an audio or audio-video communications protocol proxy which can act on the behalf of the called audio or audio-video terminals and deliver services, especially when the called terminal is not functional.

Accordingly, what is needed in the art is a system and method that accommodates a low-capability client whereby interactions and other control services may be performed in a centralized environment on behalf of the low-capability client.

SUMMARY OF THE INVENTION

To address the above-discussed deficiencies of the prior art, the present invention provides a system for, and method of, performing state-based signaling on behalf of a stateless client. In one embodiment, the system includes a controller, couplable to a state-based terminal, that translates at least one stateless signaling message received from the stateless client to at least one state-based signaling message for presentation to the state-based terminal thereby facilitating a media stream communications session between the stateless client and the state-based terminal over an Internet Protocol (IP)-based network. In a related, but alternative embodiment of the present invention, the controller translates at least one state-based signaling message received from the state-based terminal to at least one stateless signaling message for presentation to the stateless client.

The present invention introduces the broad concept of a controller that performs state-based signaling on behalf of a stateless client device to facilitate a communications session therewith. For the purposes of the present invention, a stateless client is a low capabilities device that is incapable of performing state-based signaling. In essence, it is a "dumb" terminal. In contrast, the state-based terminal is a higher capabilities device that is capable of performing state-based signaling. In essence, the state-based terminal is a complex terminal such as a multimedia personal computer. The present invention recognizes that in many environments it is advantageous to employ a low capabilities client and provide a controller to perform signaling functions therefor.

Furthermore, the controller is capable of facilitating a communications session between multiple stateless clients. The controller may perform compatibility checking and other call management and resource management related functions necessary to facilitate any communications session. Additionally, it should be clear that the references to state-based and stateless signaling messages include sequences of one or more messages in length.

For the purposes of the present invention, the IP-based network shall include presently available, and present and future related networks that are derived in whole or in part from the Internet Protocol. While the present invention is particularly advantageous when applied to an IP-based network, the principles of the present invention are equally applicable to any non-circuit switched-mode networks, especially packet-based networks.

In one embodiment of the present invention, the controller includes a protocol engine and a stateless client control engine. The related functions of the protocol engine and stateless client control engine will be delineated in detail in an embodiment of the present invention to be illustrated and described. In a related, but alternative embodiment, the controller forms an abstraction of the at least one stateless signaling message prior to translating. The abstraction is a universal layer which the controller employs to facilitate translation between the stateless and state-based signaling messages. Of course, the abstraction layer is not necessary for the broad scope of the present invention.

In one embodiment of the present invention, the system performs state-based signaling on behalf of a plurality of stateless clients. The controller is capable of facilitating communications sessions for multiple stateless clients simultaneously or successively. Additionally, the controller may facilitate communications sessions with multiple state-based terminals simultaneously or successively.

In one embodiment of the present invention, the media stream includes portions selected from the group consisting of: voice, video and data. Thus, the present invention is fully employable as part of a multimedia system wherein the communications session is adapted to carry multimedia media streams.

In one embodiment of the present invention, portions of the media stream traverse a path between the stateless client and the state-based terminal without the controller. In a related embodiment, the controller operates only with respect to call management and management of the media stream. In an alternative embodiment of the present invention, portions of the media stream traverse a path between the stateless client and the state-based terminal with the controller. The media stream may traverse a path adapted to allow point-to-point communication of the media stream between the stateless client and the state-based terminal. The controller, in one embodiment, is not part of the point-to-point communication path for the media stream. Alternatively, the media stream traverses a path including the controller.

In one embodiment of the present invention, the at least one state-based signaling message and the at least one stateless signaling message traverse a signaling path separate from a path for the media stream. Those skilled in the art are familiar with networks employing separate channels for signaling and media streams. The broad scope of the present invention, however, is not limited to any particular network architecture.

In one embodiment of the present invention, the at least one state-based signaling message is based on a protocol selected from the group consisting of: H.225, H.235, H.245 and H.323. The International Telecommunications Union-Telecommunication (ITU-T) Recommendations H.225, H.235, H.245 and H.323 provide a few examples of state-based signaling messages for various media and are only provided for illustrative purposes.

In one embodiment of the present invention, the at least one stateless signaling message includes an indication selected from the group consisting of: a telephony "off-hook" event, a telephony "on-hook" event, a telephony "button depressed" event, a telephony "digit dialed" event and a "client registration" event. In a related, but alternative embodiment of the present invention, the at least one stateless signaling message includes a command selected from the group consisting of: light a specified lamp, display text, turn a ringer on/off, play a specified tone, associate button with specified function and connect at least one media stream. Analogously, the aforementioned stateless signaling messages, commands and related functions are provided for illustrative purposes only.

In one embodiment of the present invention, the stateless client is selected from the group consisting of a device having an individual telephone, at least one digital trunk interface, at least one analog trunk interface, at least one digital station interface, at least one analog station interface and a shared system resource. The stateless client includes any device that is incapable of performing state-based signaling.

In one embodiment of the present invention, the controller is embodied as a sequence of instructions executable in a general purpose computer system. Alternatively, the present invention may be embodied in dedicated or hardwired discrete or integrated circuitry.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
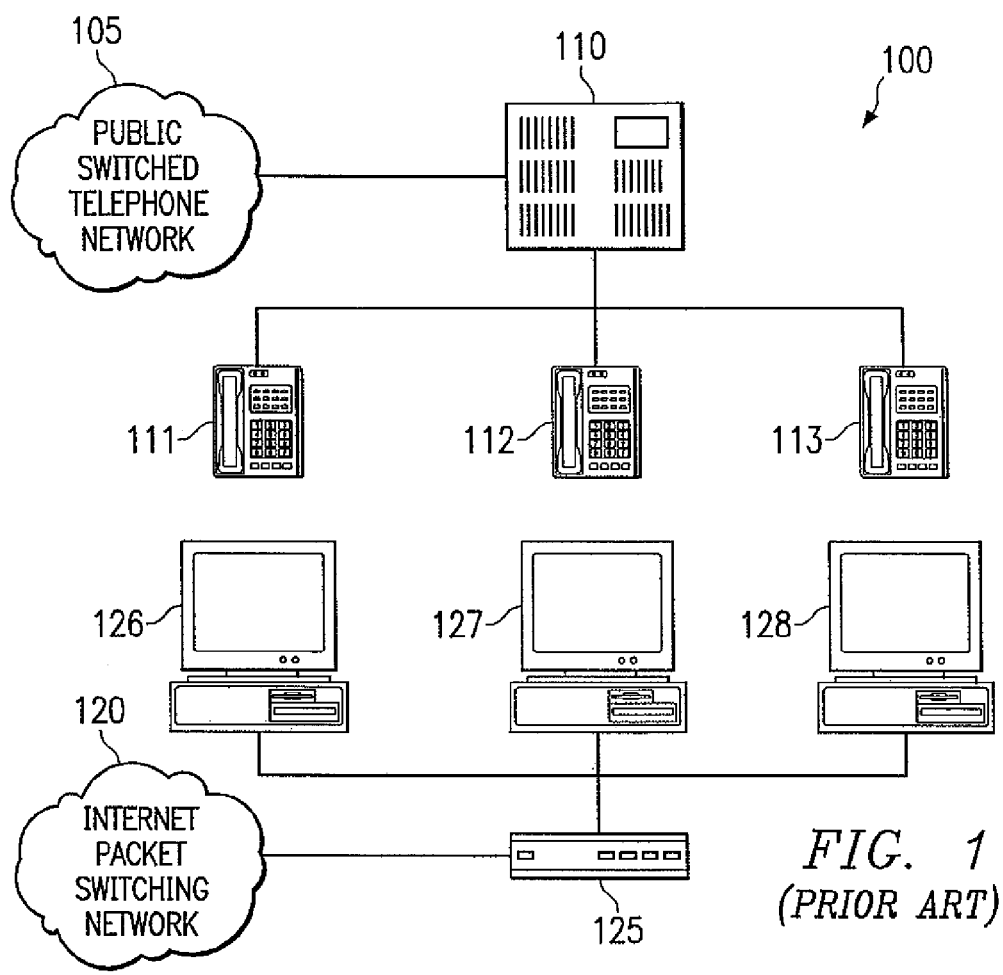
FIG. 1 illustrates a schematic diagram of a prior art system employing separate voice and data communication networks.

Referring initially to FIG. 1, illustrated is a schematic diagram showing a prior art system 100 with totally separate voice and data communication networks. The system 100 includes an external public switched telephone network 105, an internal PBX 110, and telephone end terminals 111, 112, 113 on the voice side. The system 100 includes an external internet packet switching network 120, an internal gateway 125, and end terminal desktop computer systems 126, 127, 128 on the data side. This environment requires completely separate voice network and data network wiring systems often serviced and maintained by two separate departments. The PBX 110 is an internal, private telephone routing and switching device which connects incoming voice messages to the appropriate internal telephone extension and outgoing voice messages to the appropriate external telephone by working in concert with the external, public switched telephone network 105. The gateway 125 is an internal translating device with its own processing, storage, database and routing capabilities that coordinates the interchange of internal and external data packets of information. The telephone end terminals 111, 112, 113 for the voice system are considered to be low-capability clients in that they have minimal-to-no processing or storage capabilities. The end terminal desktop computer systems 126, 127, 128 for the data system usually have extensive processing and storage capabilities.

Figure 2:
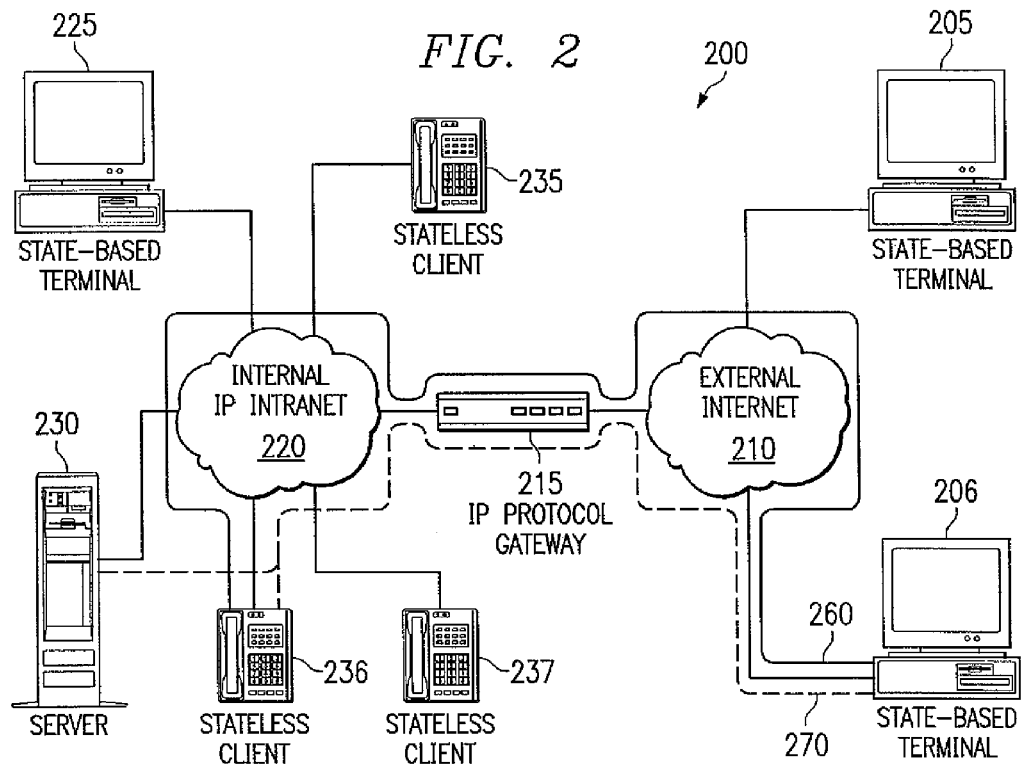
FIG. 2 illustrates a schematic diagram of an embodiment of a communications network constructed according to the principles of the present invention.

Turning now to FIG. 2, illustrated is a schematic diagram of an embodiment of a communications network 200 constructed according to the principles of the present invention. In the present embodiment, voice, video and data may be accommodated by a single network. The network 200 includes external first and second state-based terminals 205, 206, an external packet switched data network (e.g., Internet Protocol (IP)) 210, an IP gateway 215, a local network (e.g., IP Intranet) 220, a state-based terminal 225, a server 230 and first, second and third stateless clients 235, 236, 237, respectively.

As previously stated, gateway devices usually have their own processing, storage, database and routing capabilities. The IP gateway 215 (e.g., an ITU-T H.323 compatible gateway) communicates through the IP Intranet 220 with the state-based terminal 225 or the server 230 which also possesses state-based signaling capabilities. The state-based terminal 225 may receive or send state-based signaling messages (or sequences thereof) through the IP Intranet 220 to other internal state-based terminals (including the server 230) or other external state-based terminals through the Internet 210 such as the first and second state-based terminals 205, 206. Similarly, the server 230 may also communicate with other internal or external terminals.

The server 230 contains a controller that includes a protocol engine and a stateless client control engine that translates between protocols (including state-based and stateless messaging) to serve or act on behalf of either one or a plurality of the stateless clients 235, 236, 237. This translation, which is bi-directional in nature, may facilitate media stream communications sessions to and from a stateless client that it serves. The controller is further capable of producing an abstraction of a signaling message (such as the stateless signaling message) that may be translated into another signaling message (such as the state-based signaling message). Additionally, the cost of the server 230 containing the controller may be distributed or allocated over the number of stateless clients that it serves instead of requiring a desktop workstation or an internal, high performance, dedicated processor for each of the stateless clients.

Figure 3:
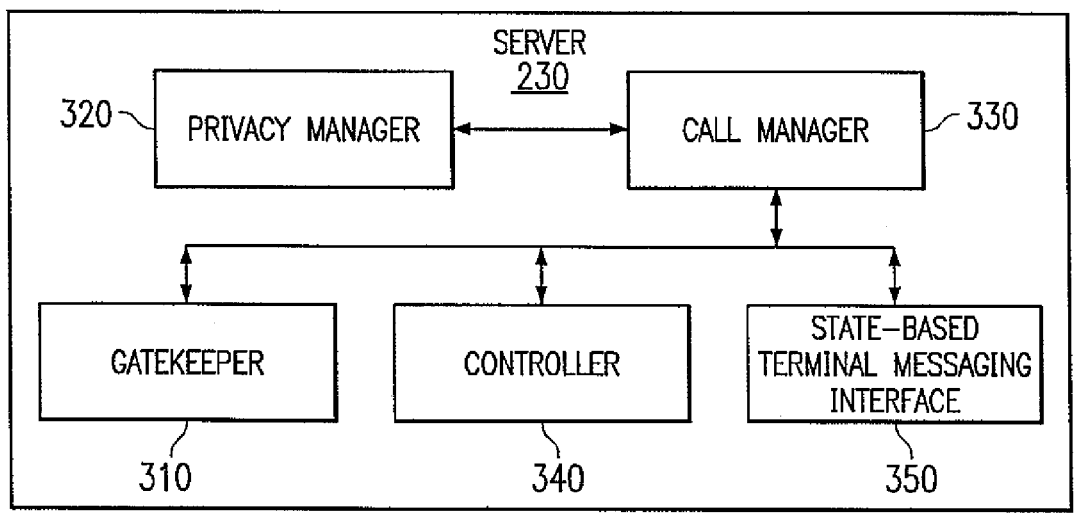
FIG. 3 illustrates a block diagram of an embodiment of a server employed in the network of FIG. 2.

Turning now to FIG. 3, illustrated is a block diagram of an embodiment of the server 230 employed in the network 200 of FIG. 2. The server 300 includes a gatekeeper 310, a privacy manager 320, a call manager 330, a controller 340 and a state-based terminal messaging interface 350.

The gatekeeper 310 functions as an element in the protocol (e.g., ITU-T Recommendation H.323) "system". The gatekeeper 310 controls the admission of state-based terminals onto the system it serves and controls the allocation of bandwidth in the IP network as a whole. The privacy manager 320 provides a privacy feature for the system it serves. This feature, although not a mandatory element, may be included for completeness. Since all end stations share a common environment, whether they are state-based terminals or stateless clients, special measures should be used to provide privacy. This feature may include functions such as Authentication (to prevent masquerading), Session Key Generation and Key Escrowing (to meet governmental requirements).

The call manager 330 provides the functionality for call processing functions such as dialed number analysis, call routing, and supplementary services. The call manager 330 interacts with the gatekeeper 310, the privacy manager 320, the controller 340 and the state-based terminal messaging interface 350. The state-based terminal messaging interface 350 provides the lower level drivers for the various state-based protocols for the call manager 330.

The controller 340, as discussed above, serves as a translator between protocols such as state-based and stateless protocols to facilitate media stream communication sessions with a stateless client or a plurality of stateless clients. The media streams may include portions selected from the group consisting of voice or other audio signals, video or data. The controller 340 may also facilitate media streams that traverse a path between a stateless client and a state-based terminal that are outside or without the controller 340. For instance, a media stream path 260 between the state-based terminal 206 and the stateless client 236 does not pass through the server 230.

Additionally, the controller 340 may facilitate a state-based signaling message and a stateless signaling message that traverse a path (e.g., signaling path 270 in the network 200 of FIG. 2) that is separate from a path used for the media stream (e.g., media stream path 260 in the network 200 of FIG. 2). The network 200 network may employ a transport protocol selected from the group consisting of an Internet Protocol (IP), an Internetwork Packet Exchange/Sequence Packet Exchange (IPX/SPX) and a Systems Network Architecture (SNA) or any other transport protocol that is applicable to any non-circuit switched-mode network. The controller 340 may be embodied as a sequence of instructions executable in a general purpose computer system such as the server 230.

Figure 4:
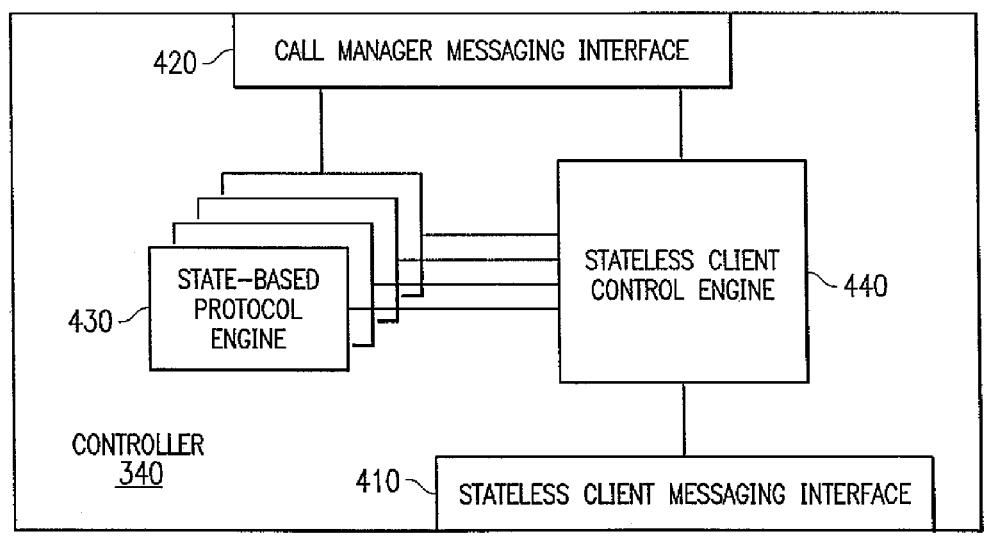
FIG. 4 illustrates an embodiment of a controller employed in the server of FIG. 3.

Turning now to FIG. 4, illustrated is an embodiment of the controller 340 employed in the server 230 of FIG. 3. The controller includes a stateless client messaging interface 410, a call manager messaging interface 420, a state-based protocol engine 430 and a stateless client control engine 440.

The stateless client messaging interface 410, which may be a single TCP/IP port or multiple ports, provides the interface for communicating commands and events between the stateless client control engine 440 and other external stateless clients. The call manager interface 420 provides the interface for communicating between the stateless client control engine 440 and the call manager 330 (see FIG. 3). The call manager interface 420 is used to invoke features and functionality controlled by the call manager.

The state-based protocol engine or protocol engine 430 receives state-based signaling messages and interprets and transfers the intent of these messages to the stateless client control engine 440 which then communicates with the appropriate stateless client or group of stateless clients to present and perform the message intent. Similarly, the stateless client control engine 440 receives stateless client messages from one or more stateless clients and presents them to the state-based protocol engine 430 for translation into state-based messages which are then communicated to the appropriate one or more state-based terminals.

More specifically, in one embodiment, the state-based protocol engine 430 forms an abstraction of the state-based signaling message received from the state-based terminal. The stateless client control engine 440 then translates the abstraction to the stateless signaling message for presentation the stateless client thereby facilitating a media stream communications session between the stateless client and the state-based terminal. Conversely, the stateless client control engine 440 forms an abstraction of the stateless signaling message received from the stateless client. The state-based protocol engine 430 then translates the abstraction to the state-based signaling message for presentation to the state-based terminal to facilitate the media stream communications session.

It should be noted that the state-based protocol engine 430 may employ any state-based protocol such as ITU Recommendations H.225, H.235, H.245 and H.323. The stateless client control engine 440 may accommodate a stateless client such as device having an individual telephone. The stateless client control engine 440 may accommodate any stateless signaling message such as a telephony "off-hook" event and any command function such as turn a ringer on/off. In those instances when the media streams do not pass through the server 230, for instance, the controller 340 may operate only with respect to call management and management of a media stream.

Figure 5:
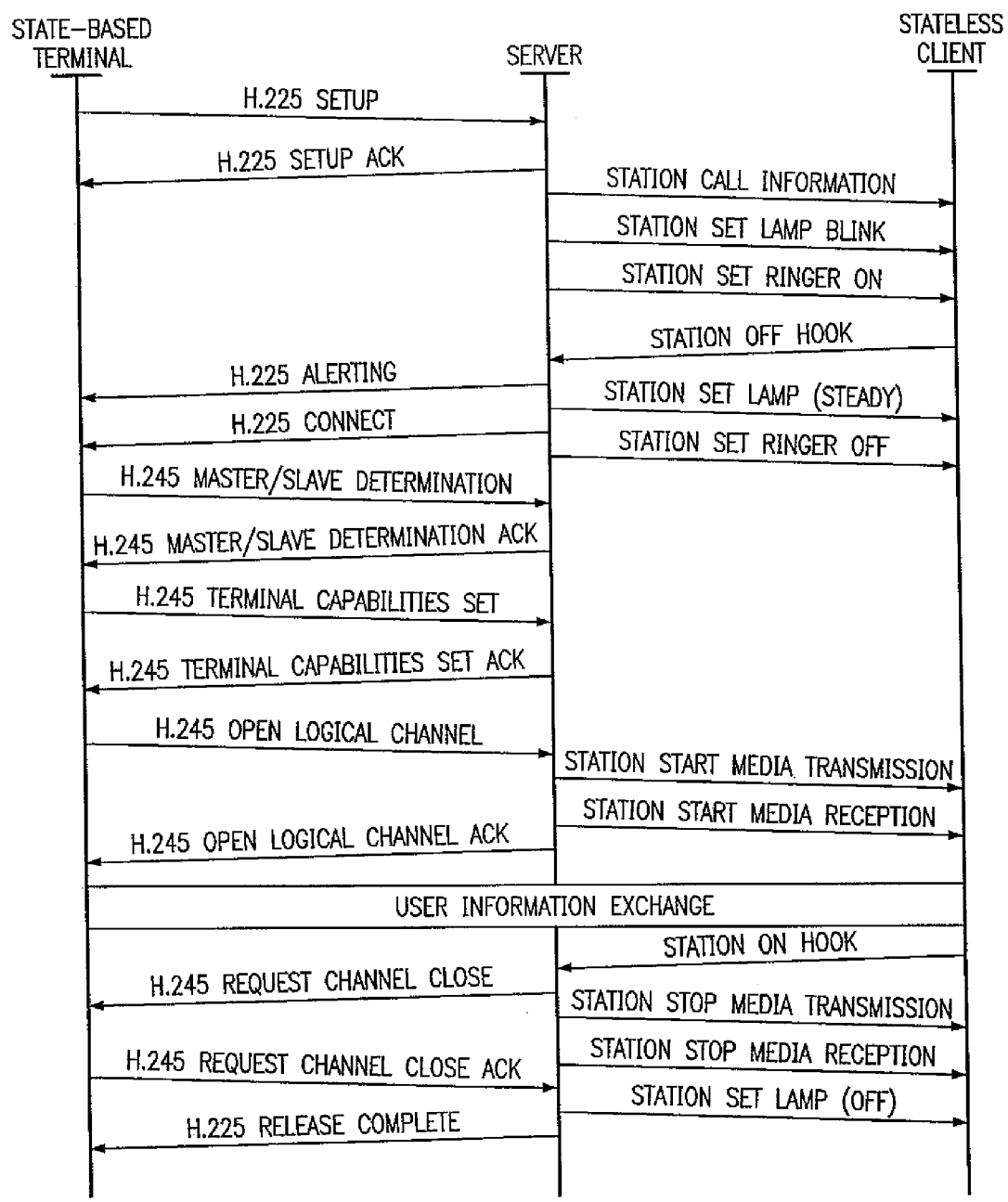
FIG. 5 illustrates an embodiment of an interaction diagram of signaling messages between a state-based terminal and a stateless client in the network of FIG. 2.

Turning now to FIG. 5, illustrated is an embodiment of an interaction diagram of signaling messages between a state-based terminal and a stateless client in the network 200 of FIG. 2. The diagram illustrates that a server is interposed between the state-based terminal and the stateless client. As previously, the server contains a controller which is the main transacting element involved in the interactions which follow. Initially, the state based terminal issues an H.225 Setup request which is acknowledged by the server with H.225 Setup Ack. Then the server issues three commands to the stateless client, namely, Station Call Info, Station Set Lamp (Blink), and Station Set Ringer (On) and responds to the state-based terminal with H.225 Alerting message. The stateless client responds with Station Off Hook and the server informs the state-based terminal with H.225 Connect message and commands the stateless client with a Station Set Lamp (Steady) and Station Set Ringer (Off).

Then the state-based terminal sends an H.245 Master Slave Determination signal to the server which acknowledges with H.245 Master Slave Determination Ack. The state-based terminal then returns an H.245 Terminal Capability Set signal to the server which acknowledges with an H.245 Terminal Capability Set Ack. The state-based terminal responds with an H.245 Open Logical Channel signal which causes the server to communicate with the stateless client with commands Station Start Media Transmission and Station Start Media Reception. The server also responds with an H.245 Open Logical Channel Ack to the state-based terminal. This enables the User Information Exchange to take place as shown.

At the completion of the User Information Exchange, the stateless client informs the server with a Station On Hook signal. The server sends an H.245 Request Channel Close signal to the state-based terminal and Station Stop Media Transmission and Station Stop Media Reception commands to the stateless client. The state-based terminal acknowledges with an H.234 Request Channel Close Ack. The server sends a Station Set Lamp (Off) command to the stateless client followed by an H.225 Release Complete signal to the state-based terminal which completes the cycle. The aforementioned signaling sequence is obviously an exemplary sequence and is submitted for illustrative purposes only.

Figure 6:
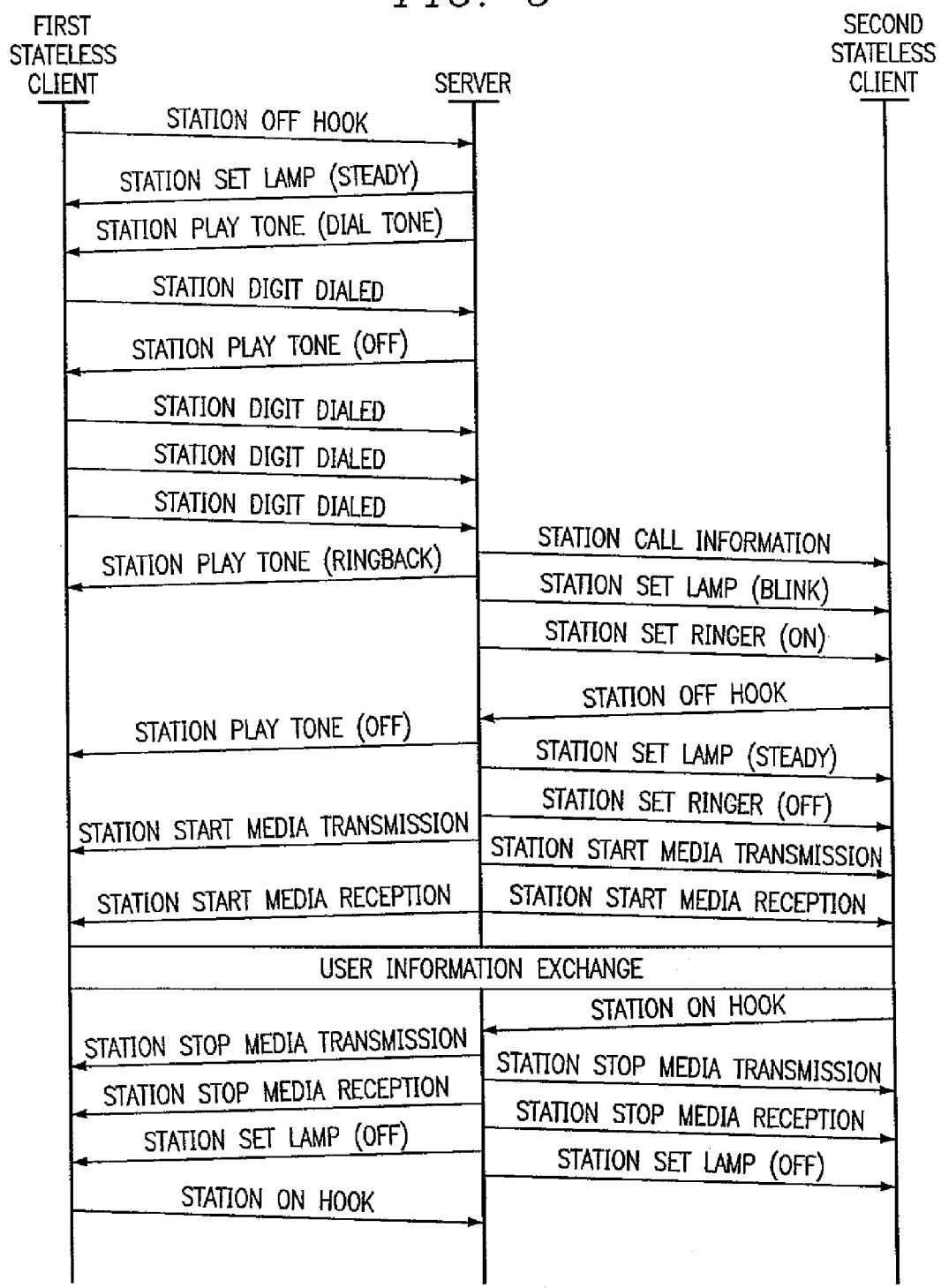
FIG. 6 illustrates an embodiment of an interaction diagram of signaling messages between two stateless clients in the network of FIG. 2.

Turning now to FIG. 6, illustrated is an embodiment of an interaction diagram of signaling messages between two stateless clients in the network 200 of FIG. 2. The diagram illustrates that a server is interposed between the state-based terminal and the stateless client. As previously, the server contains a controller which is the main transacting element involved in the interactions which follow. As illustrated, the process begins when the first stateless client initiates a call attempt by signaling a Station OffHook event to the server. The server responds by returning both a Station Set Lamp (steady) and a Station Play Tone (Dial Tone) message to the first stateless client. The first stateless client then returns a telephony Station Digit Dialed event. The server responds by sending a Station Play Tone (Off) command. The server continues to receive telephony Station Digit Dialed events until a valid address is received. The server terminates the digit collection phase of the initiation by sending a Station Play Tone (Ringback) to the first stateless client.

Next, the server begins the call arrival notification process by sending a set of three messages to the second stateless client. These messages include Station Call Information, Station Set Lamp (Blink) and Station Set Ringer (On). The second stateless client answers the call by sending a Station OffHook message to the server. The server responds to the second stateless client by sending Station Set Lamp (steady) and Station Set Ringer (Off). The server then proceeds to effect the media stream connection by sending Station Start Media Transmission and Station Start Media Reception messages to both the first and second stateless clients. The two stateless clients may now enter the User Information Exchange phase of the call.

At the conclusion of the User Information Exchange, one of the stateless clients will begin the call clearing phase by sending a Station OnHook message to the server. The server responds by sending a Station Stop Media Transmission, a Station Stop Media Reception and a Station Set Lamp (Off) command to both the first and second stateless clients. The first stateless client responds with a Station OnHook message and this terminates the call between the first and second stateless client. The aforementioned signaling sequence is obviously an exemplary sequence and is submitted for illustrative purposes only.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data-Network Design*, by Darren L. Spohn, McGraw-Hill, Inc. (1993) and conventional data communications is more fully discussed in *Voice and Data Communications Handbook*, by Bud Bates and Donald Gregory, McGrawHill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Although the present invention and its advantages have been described in detail, those skilled in the art should understand that they can make various changes, substitutions and alterations herein without departing from the spirit and scope of the invention in its broadest form.

What is claimed is:

1. A method, comprising:
receiving, by a server located at a customer premises coupled to a local network, an indication from at least one gateway device to initiate a communications session between a stateless dumb terminal coupled to the local network and a state-based remote terminal coupled to an external packet switched network, the server comprising a network interface and a controller, the network interface directly coupled to the local network, the at least one gateway device coupled to the local network and the external packet switched network, the server coupled to the at least one gateway device through the local network;
translating, by the server, at least one stateless signaling message received from the stateless dumb terminal into at least one state-based signaling message corresponding to the state-based remote terminal; and
transmitting, by the server, the at least one state-based signaling message to the at least one gateway device for presentation to the state-based remote terminal, thereby establishing the communications session and facilitating a media stream path without the server between the stateless dumb terminal and the state-based remote terminal.

2. The method of claim 1, wherein the external packet switched network employs an Internetwork Packet Exchange/Sequenced Packet Exchange (IPX/SPX) transport protocol.

3. The method of claim 1, wherein the state-based remote terminal comprises a computer executing telephony software.

4. The method of claim 1, further comprising receiving, by the server, an off-hook signal in response to a user of the stateless dumb terminal indicating a desire to establish the communications session.

5. The method of claim 1, wherein the at least one stateless signaling message comprises an indication selected from the group consisting of:
a telephony off-hook event, a telephony on-hook event,
a telephony button depressed event,
a telephony digit dialed event, and
a client registration event.

6. The method of claim 1, wherein the state-based remote terminal comprises a computer executing telephony software that supports the H.323 protocol.

7. A server located at a customer premises coupled to a local network, comprising:
a processor;
a network interface directly coupled to the local network, the network interface operable to receive an indication from at least one gateway device to initiate a communications session between a stateless dumb terminal coupled to the local network and a state-based remote terminal coupled to an external packet switched network, the at least one gateway device coupled to the local network and the external packet switched network, the server couple to the at least one gateway device through the local network; and
a storage device embodying a controller operable, when executed on the processor, to:
translate at least one stateless signaling message received from the stateless dumb terminal into at least one state-based signaling message corresponding to the state-based remote terminal; and
transmit the at least one state-based signaling message to the at least one gateway device for presentation to the state-based remote terminal, thereby establishing the communications session and facilitating a media stream path without the server between the stateless dumb terminal and the state-based remote terminal.

8. The server of claim 7, wherein the external packet switched network employs an Internetwork Packet Exchange/Sequenced Packet Exchange (IPX/SPX) transport protocol.

9. The server of claim 7, wherein the state-based remote terminal comprises a computer executing telephony software.

10. The server of claim 7, wherein the network interface is further operable to receive an off-hook signal in response to a user of the stateless dumb terminal indicating a desire to establish the communications session.

11. The server of claim 7, wherein the at least one stateless signaling message comprises an indication selected from the group consisting of:
a telephony off-hook event, a telephony on-hook event,
a telephony button depressed event, a telephony digit dialed event, and
a client registration event.

12. The server of claim 7, wherein the state-based remote terminal comprises a computer executing telephony software that supports the H.323 protocol.

13. A non-transitory computer-readable storage medium comprising instructions located at a customer premises coupled to a local network, the instructions operable when executed on a processor to:
receive an indication from at least one gateway device to initiate a communications session between a stateless dumb terminal coupled to the local network and a state-based remote terminal coupled to an external packet switched network, the at least one gateway device coupled to the local network and the external packet switched network;
translate at least one stateless signaling message received from the stateless dumb terminal into at least one state-based signaling message corresponding to the state-based remote terminal; and
transmit the at least one state-based, signaling message to the at least one gateway device for presentation to the state-based remote terminal, thereby establishing the communications session and facilitating a media stream path without a server between the stateless dumb terminal and the state-based remote terminal, the server coupled to the at least one gateway device through the local network, the server comprising a network interface directly coupled to the local network.

14. The non-transitory computer-readable storage medium of claim 13, wherein the external packet switched network employs an Internetwork Packet Exchange/Sequenced Packet Exchange (IPX/SPX) transport protocol.

15. The non-transitory computer-readable storage medium of claim 13, wherein the state-based remote terminal comprises a computer executing telephony software.

16. The non-transitory computer-readable storage medium of claim 13, wherein the instructions are further operable when executed on a processor to receive an off-hook signal in response to a user of the stateless dumb terminal indicating a desire to establish the communications session.

17. The non-transitory computer-readable storage medium of claim 13, wherein the at least one stateless signaling message comprises an indication selected from the group consisting of:
a telephony off-hook event, a telephony on-hook event, a telephony button depressed event,
a telephony digit dialed event, and
a client registration event.

* * * * *